US010449895B2

(12) United States Patent
Pozzi et al.

(10) Patent No.: US 10,449,895 B2
(45) Date of Patent: Oct. 22, 2019

(54) OBJECT TRACKING ILLUMINATION SYSTEM

(71) Applicant: Rockwell Collins, Inc., Cedar Rapids, IA (US)

(72) Inventors: Alexander Pozzi, Winston-Salem, NC (US); Francis Xavier L. Garing, Atlanta, GA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/926,603

(22) Filed: Mar. 20, 2018

(65) Prior Publication Data

US 2019/0291637 A1    Sep. 26, 2019

(51) Int. Cl.
*B60Q 3/47* (2017.01)
*B60Q 3/44* (2017.01)
(Continued)

(52) U.S. Cl.
CPC .............. *B60Q 3/47* (2017.02); *B60Q 3/44* (2017.02); *B60Q 2900/30* (2013.01);
(Continued)

(58) Field of Classification Search
CPC ........ B60Q 3/47; B60Q 3/44; B60Q 2900/30; B64D 2011/0038; G01S 13/06; G06K 7/10415; G06T 7/00; G06T 2207/10048
See application file for complete search history.

(56) References Cited

U.S. PATENT DOCUMENTS

| 9,725,033 B1 | 8/2017 | Johannessen |
| 2004/0090787 A1* | 5/2004 | Dowling ............ H05B 33/0842 362/464 |

(Continued)

FOREIGN PATENT DOCUMENTS

| CN | 1970339 A   * | 5/2007 | ............... B60Q 3/85 |
| EP | 1408276 A2    | 4/2004 | |

(Continued)

OTHER PUBLICATIONS

Cui et al., CN 208128374, Nov. 20, 2018 (Year: 2018).*
Extended Search Report dated Jun. 26, 2019 for EP Application No. 19164132.3.

*Primary Examiner* — Mary Ellen Bowman
(74) *Attorney, Agent, or Firm* — Angel N. Gerdzhikov; Donna P. Suchy; Daniel M. Barbieri

(57) ABSTRACT

In embodiments, an illumination system includes a plurality of light sources and a plurality of fixed communicators disposed within the passenger cabin. The plurality of fixed communicators can be configured to send signals to or receive signals from a mobile communicator coupled to or carried by an object. The illumination system further includes a controller in communication with the plurality of light sources and the plurality of fixed communicators and/or the mobile communicator. The controller is configured to determine a location of the object within the passenger cabin based on signals communicated between the plurality of fixed communicators and the mobile communicator. The controller is further configured to selectively activate one or more of the light sources based on the determined location of the object to illuminate a portion of the passenger cabin in proximity to the object.

20 Claims, 11 Drawing Sheets

(51) Int. Cl.
*G01S 13/06* (2006.01)
*G06T 7/00* (2017.01)
*B64D 11/00* (2006.01)
*G06K 7/10* (2006.01)

(52) U.S. Cl.
CPC ....... *B64D 2011/0038* (2013.01); *G01S 13/06* (2013.01); *G06K 7/10415* (2013.01); *G06T 7/00* (2013.01); *G06T 2207/10048* (2013.01)

(56) References Cited

U.S. PATENT DOCUMENTS

| | | | |
|---|---|---|---|
| 2013/0063340 A1* | 3/2013 | Mondragon | G09G 5/00 345/156 |
| 2014/0313751 A1 | 10/2014 | Abel | |
| 2015/0261299 A1* | 9/2015 | Wajs | G06F 3/011 726/19 |
| 2015/0324656 A1* | 11/2015 | Marks | G01J 5/0025 383/103 |
| 2017/0282828 A1* | 10/2017 | Carenza | G01S 7/40 |

FOREIGN PATENT DOCUMENTS

| | | | | |
|---|---|---|---|---|
| EP | 2515618 A1 | | 10/2012 | |
| GB | 2536712 A | * | 9/2016 | ............. B60Q 3/76 |
| WO | 2015130571 A1 | | 9/2015 | |
| WO | 2016191560 A1 | | 12/2016 | |

* cited by examiner

OBJECT TRACKING ILLUMINATION SYSTEM

BACKGROUND

Vehicles for mass transport can include, but are not limited to, aircrafts, boats, trains, and busses. The passenger cabins in these types of vehicles are typically designed for long travel durations (e.g., one or more hours of travel). As such, the passenger cabins can include cushioned and/or reclining seats. Sometimes the seats can also include entertainment consoles. Lights within a passenger cabin may be dimmed or turned off at times so that passengers may rest their eyes, watch movies, or sleep if desired.

It is common for services to be provided during travel. For example, cabin attendants may provide passengers with food and/or beverages, merchandise (e.g., duty free) sales, and so forth. Cabin attendants may roll carts or carry trays with service items (e.g., food, beverages, merchandise, etc.) down aisles in the passenger cabin at various times so that passengers wanting these items can receive them.

Care is taken not to disturb passengers that are resting or sleeping, but in some instances, it is impossible not to disturb resting or sleeping passengers while providing services to the other passengers. For example, lights within the passenger cabin may have to be turned on or turned up (brightened) so that cabin attendants and passengers receiving services are able to see. Alternatively, cabin attendants and passengers receiving service may have limited visibility because the lights within the passenger cabin are turned off or dimmed so as not to disturb resting or sleeping passengers.

Sometimes cabin attendants use flashlights or lanterns to see better while the lights within the cabin are turned off or dimmed. However, the use of a flashlight or lantern may prevent a cabin attendant from being able to hold other items with both hands. There is a need for more robust lighting solutions that improve visibility for cabin attendants and for passengers receiving service without disturbing resting or sleeping passengers.

SUMMARY

In one aspect, embodiments of the inventive concepts disclosed herein are directed to an illumination system for a passenger cabin. The illumination system is configured to track an object and illuminate a portion of the passenger cabin in proximity to the object. The illumination system includes a plurality of light sources and a plurality of fixed communicators disposed within the passenger cabin. The fixed communicators can be configured to send signals to and/or receive signals from a mobile communicator coupled to or carried by an object. The illumination system further includes a controller in communication with the plurality of light sources and the fixed communicators and/or the mobile communicator. The controller can be configured to determine a location of the object within the passenger cabin based on signals communicated between the plurality of fixed communicators and the mobile communicator. The controller can be further configured to selectively activate (e.g., turn on (e.g., switch from an off state to an on state) or turn up (e.g., brighten or increase light intensity of)) one or more of the light sources based on the determined location of the object to illuminate a portion of the passenger cabin in proximity to the object. For example, each of the light sources can be configured to illuminate a respective portion of the passenger cabin, and the controller can be configured to activate at least one light source that is configured to illuminate the portion of the passenger cabin at or near a location of the object. The controller can be configured to leave other light sources in a deactivated (e.g., off or dimmed) state.

In some embodiments, the object is a cart (e.g., a food and/or beverage cart, a merchandise cart, a first aid cart, a magazine cart, or the like) that can be tracked by the illumination system. The cart can include a frame, a plurality of rollers (e.g., wheels) coupled to the frame, and a mobile communicator coupled to the cart or carried on/in the cart. The controller can be configured to determine a location of the cart based on signals communicated between the plurality of fixed communicators and the mobile communicator. The controller can be further configured to selectively activate one or more of the light sources based on the determined location of the cart to illuminate a portion of the passenger cabin in proximity to the cart. For example, the controller can be configured to turn on or turn up the lights in an area where the cart is located. This can help provide cabin attendants and selected passengers with an ability to see (e.g., for food service, beverage service, etc.) without disturbing other passengers in the passenger cabin.

In a further aspect, embodiments of the inventive concepts disclosed herein are directed to a method for tracking an object within a passenger cabin and illuminating a portion of the passenger cabin in proximity to the object. The method includes communicating signals between a plurality of fixed communicators within the passenger cabin and a mobile communicator coupled to or carried by the object (e.g., a cart, service tray, or the like). A location of the object within the passenger cabin is determined based on the signals communicated between the plurality of fixed communicators and the mobile communicator. For example, the location of the object can be determined based on signals transmitted between the mobile communicator and two or more fixed communicators (e.g., by employing a triangulation or multilateration (MLAT) algorithm, or the like). In another example, the location of the object can correspond to a location of a fixed communicator having strongest signal communication with the mobile communicator or a fixed communicator near enough to the mobile communicator to allow for signal communication. After determining the location of the object within the passenger cabin, one or more light sources are activated (e.g., turned on or turned up) to illuminate the portion of the passenger cabin in proximity to the object. Meanwhile, other light sources in the passenger cabin can be maintained in a deactivated (e.g., off or dimmed) state.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
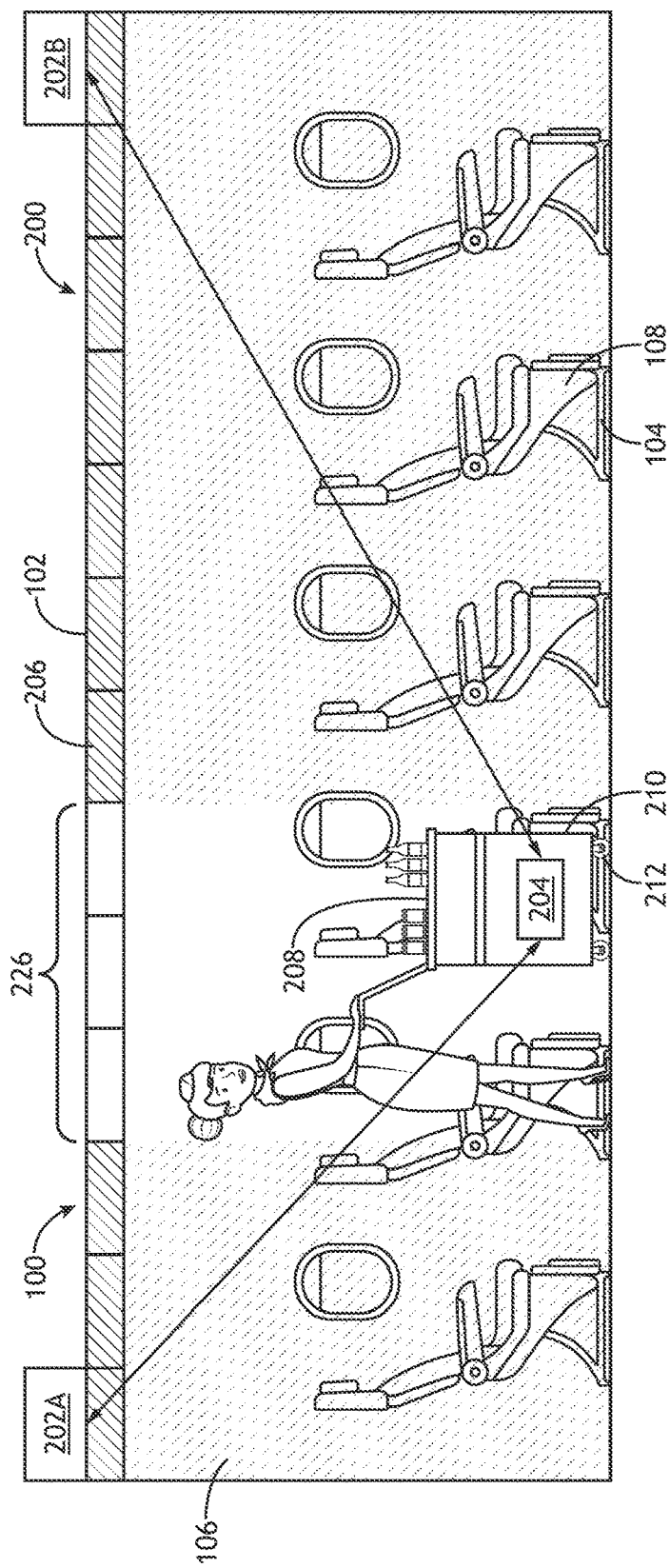
FIG. 1 is an illustration of an aircraft environment including an object tracking illumination system in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, la, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an object tracking illumination system for a passenger cabin. The illumination system can be configured to track an object and illuminate a portion of the passenger cabin in proximity to the object. In embodiments, the object can be a cart rolled down an aisle by a cabin attendant when providing service items (e.g., food, beverages, merchandise, etc.) for passengers. By illuminating the portion of the passenger cabin in proximity to the object (e.g., the cart) while maintaining other portions of the passenger cabin in turned off or dimmed lighting conditions, the illumination system may improve visibility for cabin attendants and for passengers receiving service without disturbing other passengers (e.g., resting or sleeping passengers) in the passenger cabin.

FIGS. 1 through 6 illustrate example embodiments of a passenger cabin 100 (e.g., for an aircraft or any other vehicle) that includes an object tracking illumination system 200. The illumination system 200 includes a plurality of light sources 206 disposed within the passenger cabin 100. In embodiments, the light sources 206 can include, but are not limited to, light emitting diodes (LEDs), incandescent lights, fluorescent lights, or any combination thereof. FIGS. 1 through 6 shows embodiments of the illumination system 200 with light sources 206 arranged along an overhead portion 102 of the passenger cabin 100. In other embodiments, the light sources 206 may be located on the floor 104, walls 106, passenger seats 108, or any other structure or set of structures in the passenger cabin 100. In some embodiments, the light sources 206 are distributed among a combination of structures (e.g., overhead portion 102, floor 104, walls 106, passenger seats 108, etc.) within the passenger cabin 100. Light sources 206 or groups of light sources 206 can be configured to illuminate respective portions of the passenger cabin 100. For example, FIG. 1 illustrates a group 226 of light sources 206 illuminating a portion of the passenger cabin 100 while the light sources 206 proximate to other portions of the passenger cabin 100 are turned off or dimmed.

The illumination system 200 further includes a plurality of fixed communicators 202 that can be configured to send and/or receive signals. For example, the fixed communicators 202 can be configured to send signals to and/or receive signals from a mobile communicator 204 that is coupled to, disposed within, disposed upon, or otherwise carried by an object 208. In embodiments, the object 208 may include, but is not limited to, a service cart, tray, cabin attendant garment, cabin attendant communication device, or the like. For example, FIGS. 1 through 6 illustrate example embodiments where the object 208 is a cart (e.g., a food and/or beverage cart, a merchandise cart, a first aid cart, a magazine cart, or the like) that can be tracked by the illumination system 200. The cart (object 208) can include a frame 210 and a plurality of rollers 212 (e.g., wheels) coupled to the frame 210, where the mobile communicator 204 coupled to the cart (object 208) or otherwise carried on or in the cart (object 208).

Figure 2:
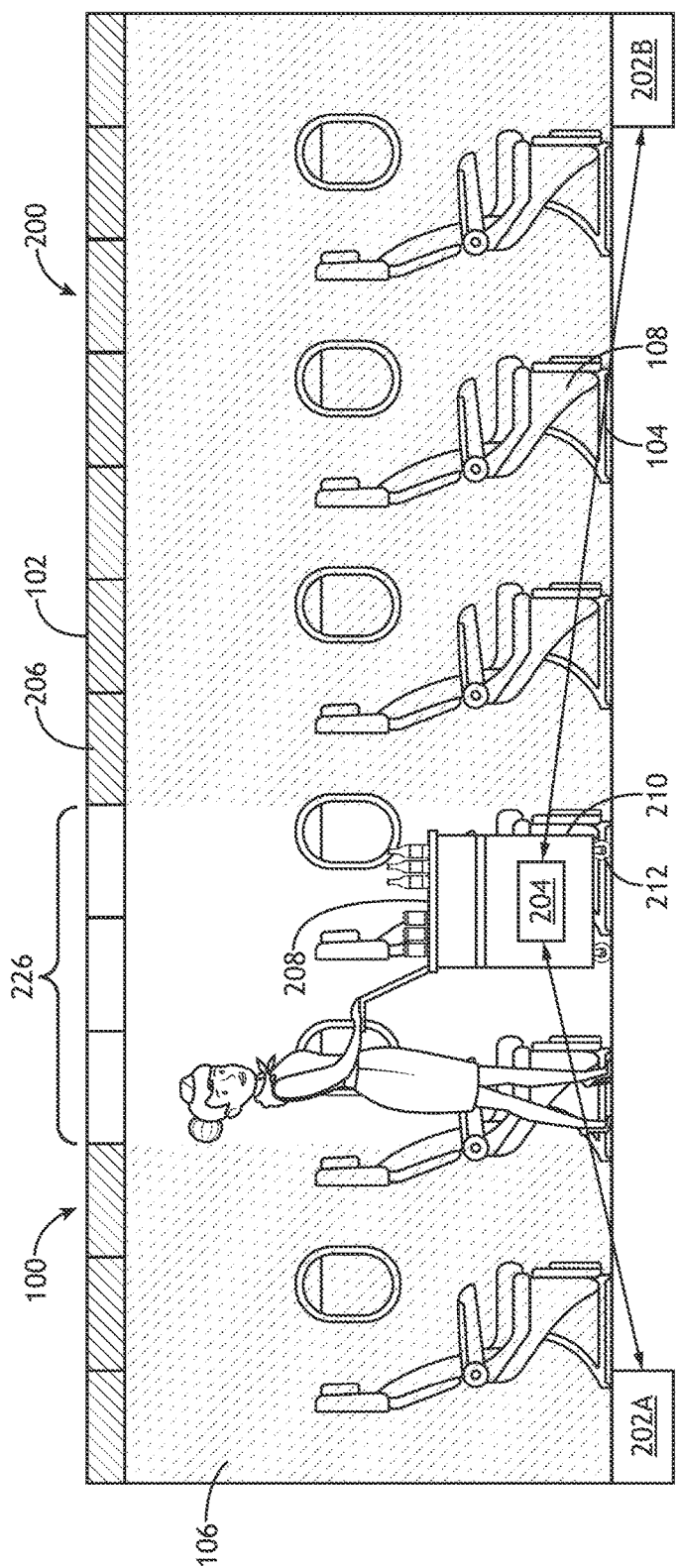
FIG. 2 is an illustration of an aircraft environment including an object tracking illumination system in accordance with example embodiments of this disclosure.

In an embodiment shown in FIG. 1, the fixed communicators 202 (e.g., communicator 202A and communicator 202B) are located at or near the overhead portion 102 of the passenger cabin 100. For example, the fixed communicators 202 may be located near the light sources 206 and other components (e.g., controller 300 and other fixed components) of the illumination system 200. This arrangement may reduce wiring and/or space requirements of the illumination system 200. However, the fixed communicators 202 may be disposed in several other locations. For example, FIG. 2 illustrates an embodiment of the illumination system 200 with the fixed communicators 202 (e.g., communicator 202A and communicator 202B) located at or near the floor 104 of the passenger cabin 100.

Figure 3:
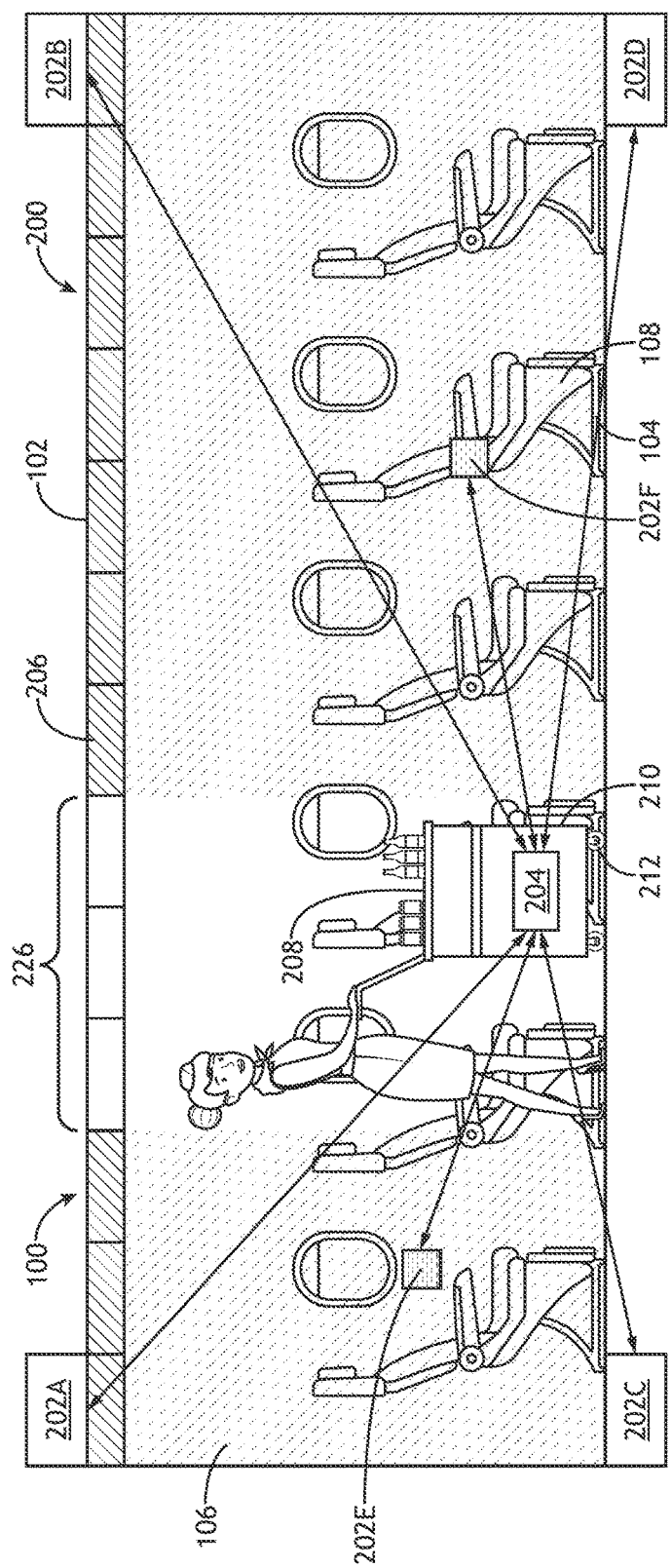
FIG. 3 is an illustration of an aircraft environment including an object tracking illumination system in accordance with example embodiments of this disclosure.

FIG. 3 illustrates an embodiment of the illumination system 200 with fixed communicators 202 (e.g., communicator 202A and communicator 202B) located at or near the overhead portion 102 of the passenger cabin 100, fixed communicators 202 (e.g., communicator 202C and communicator 202D) located at or near the floor 104 of the passenger cabin 100, a fixed communicator 202E located on a wall 106 of the passenger cabin 100, and a fixed communicator 202F located on a seat 108 in the passenger cabin 100. The configurations illustrated in FIGS. 1 through 3 are provided as examples to show that any number of fixed communicators 202 can be located on or near any structure or combination of structures within the passenger cabin 100.

In embodiments, it can be advantageous to place the fixed communicators 202 at a distance from one another so that signals communicated between the mobile communicator 204 and fixed communicators 202 can be used for triangulation, multilateration (MLAT), or other localization algorithms. For example, a location of the mobile communicator 204 (and hence, the object 208) can be determined based on signal parameters (e.g., timing parameters (e.g., times of flight), x-y-z signal components, etc.) of a first signal communicated to or from a first fixed communicator 202 (e.g., communicator 202A) and a second signal communicated to or from a second fixed communicator (e.g., communicator 202B). Various localization techniques based on a plurality of signals communicated between the mobile communicator 204 and two or more fixed communicators 202 are further discussed herein with reference to FIG. 7.

Figure 4:
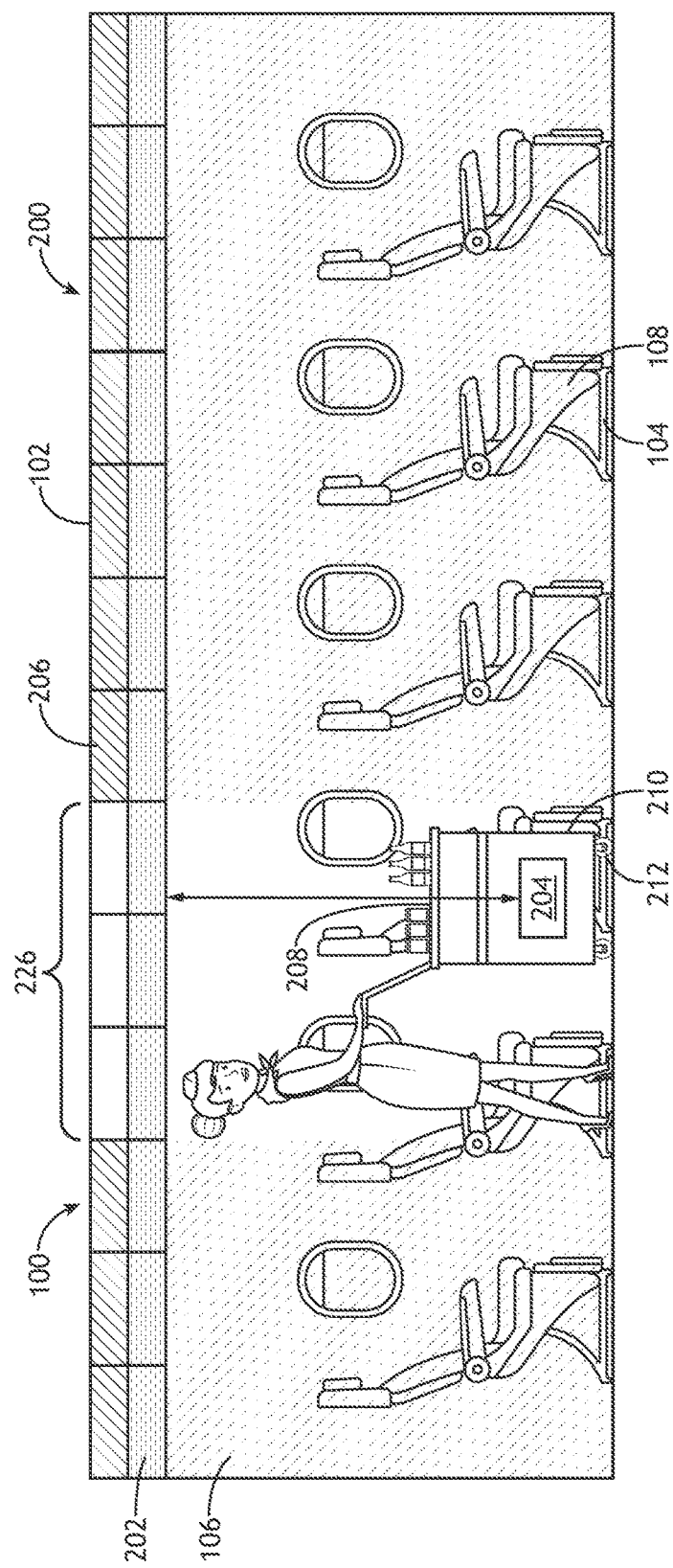
FIG. 4 is an illustration of an aircraft environment including an object tracking illumination system in accordance with example embodiments of this disclosure.
Figure 5:
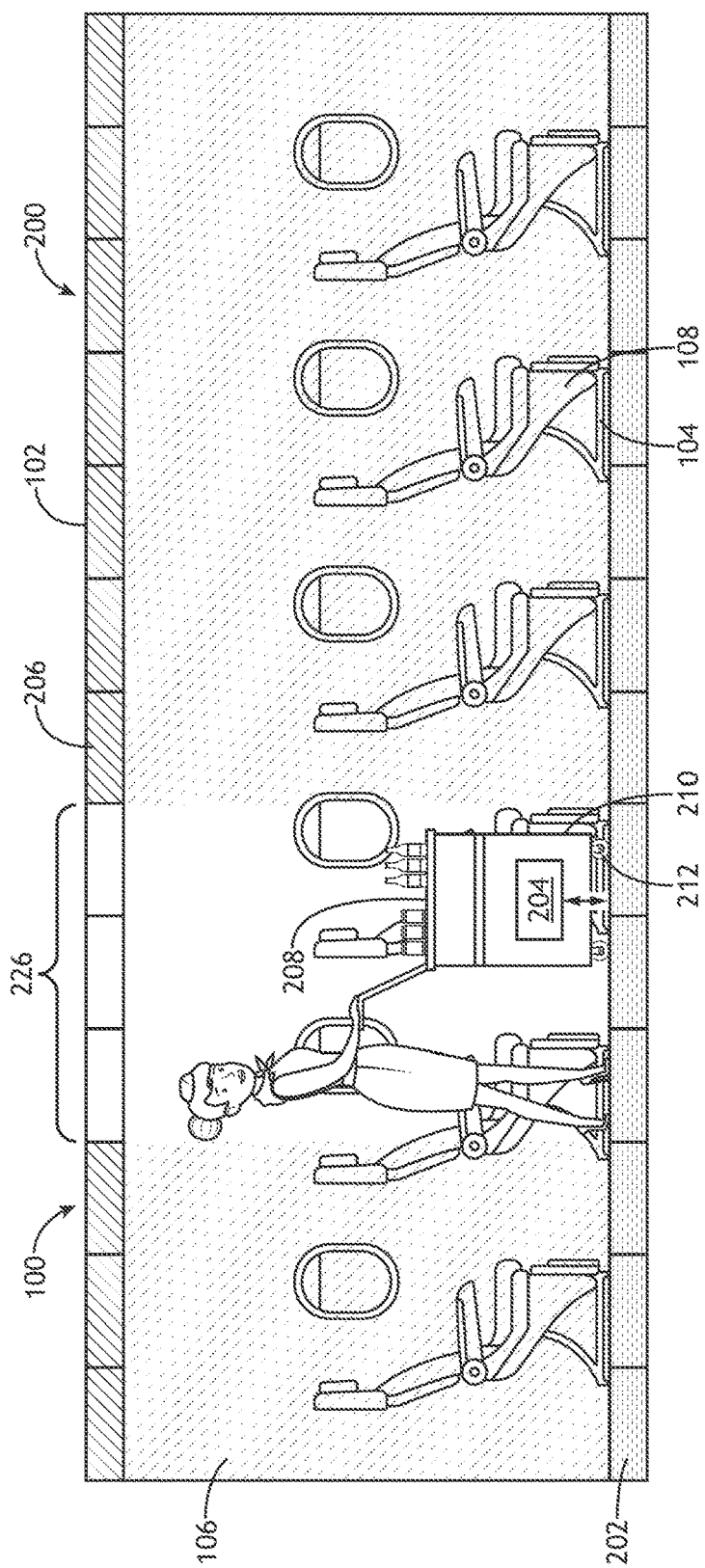
FIG. 5 is an illustration of an aircraft environment including an object tracking illumination system in accordance with example embodiments of this disclosure.
Figure 6:
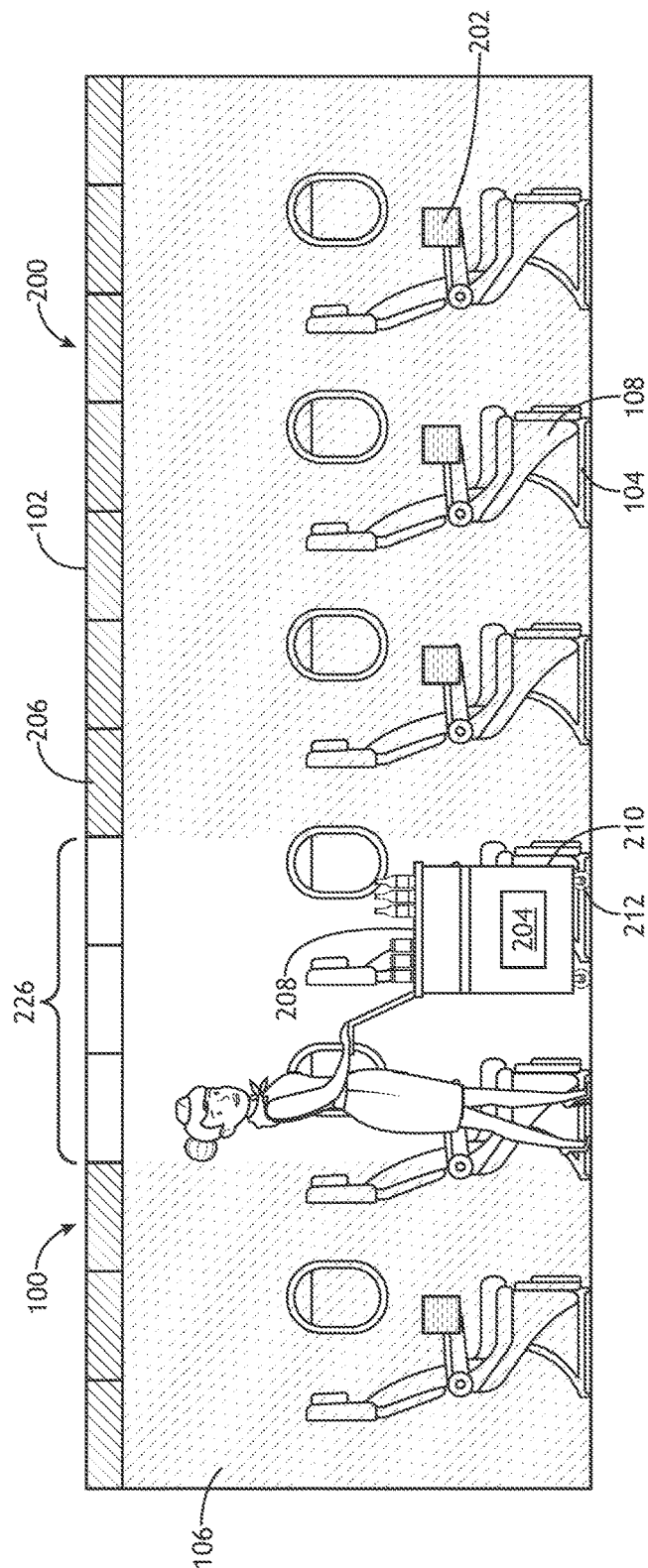
FIG. 6 is an illustration of an aircraft environment including an object tracking illumination system in accordance with example embodiments of this disclosure.

In other embodiments, the fixed communicators 202 can be placed throughout the passenger cabin 100 with relatively short distances in between the fixed communicators 202 for proximity-based localization with short-range communication signals (e.g., optical signals, RFID signals, NFC signals, or the like). Rather than relying on signals communicated between the mobile communicator 204 and two or more fixed communicators 202, the illumination system 200 may be configured to track the object 208 based on its proximity to a particular fixed communicator 202 or set of fixed communicators 202 at any given time. For example, FIGS. 4 through 6 show example embodiments of the illumination system 200 with fixed communicators 202 distributed along the head portion 102 of the passenger cabin 100, floor 104 the passenger cabin 100, or passenger seats 108 of the passenger cabin 100, respectively. These are some example configurations; however, the fixed communicators 202 can be arranged in a similar manner on any set or combination of structures in the passenger cabin 100. Each fixed communicator 202 or set of fixed communicators 202 may correspond to a respective portion of the passenger cabin 100. In some embodiments, the distance from one fixed communicator 202 to another fixed communicator 202 is less than or equal to a distance between rows of the passenger seats 108 or is less than or equal to a distance corresponding to a length of the aisle occupied by two rows of passenger seats 108, three rows of passenger seats 108, four rows of passenger seats 108, etc., up to eight rows of passenger seats 108.

In embodiments such as those shown in FIGS. 4 through 6, the location of the object 208 can be determined by detecting a fixed communicator 202 that is close enough to the mobile communicator 204 for a signal to be communicated between the fixed communicator 202 and the mobile communicator 204. When two or more fixed communicators 202 are in detectable range, the location of the object 208 can be determined based on the fixed communicator 202 that has the strongest or highest performance communication link with the mobile communicator 204. Various short-range communication protocols that can be used for proximity-based localization are further discussed herein with reference to FIGS. 8 and 9.

Figure 7:
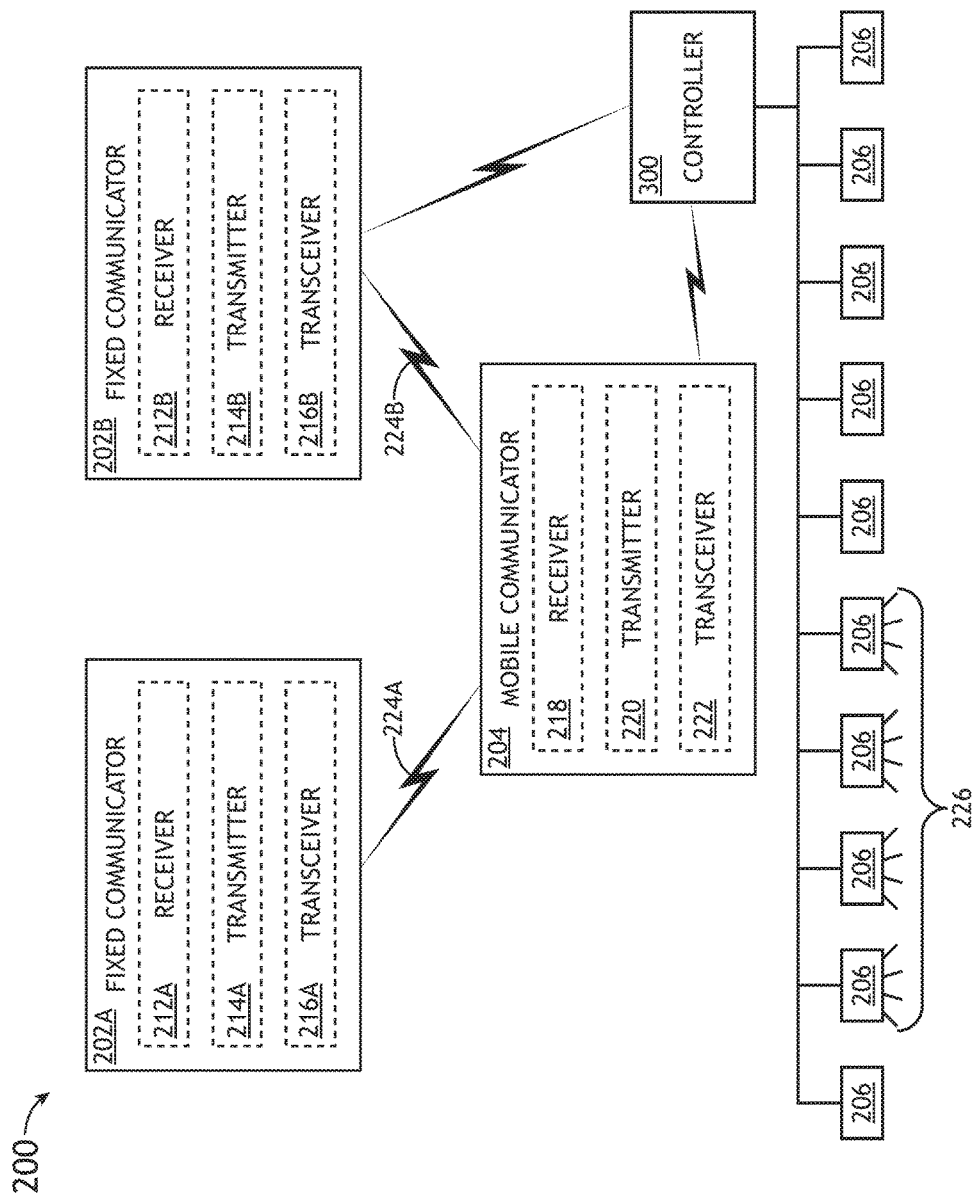
FIG. 7 is a block diagram illustrating an object tracking illumination system in accordance with example embodiments of this disclosure.
Figure 8:
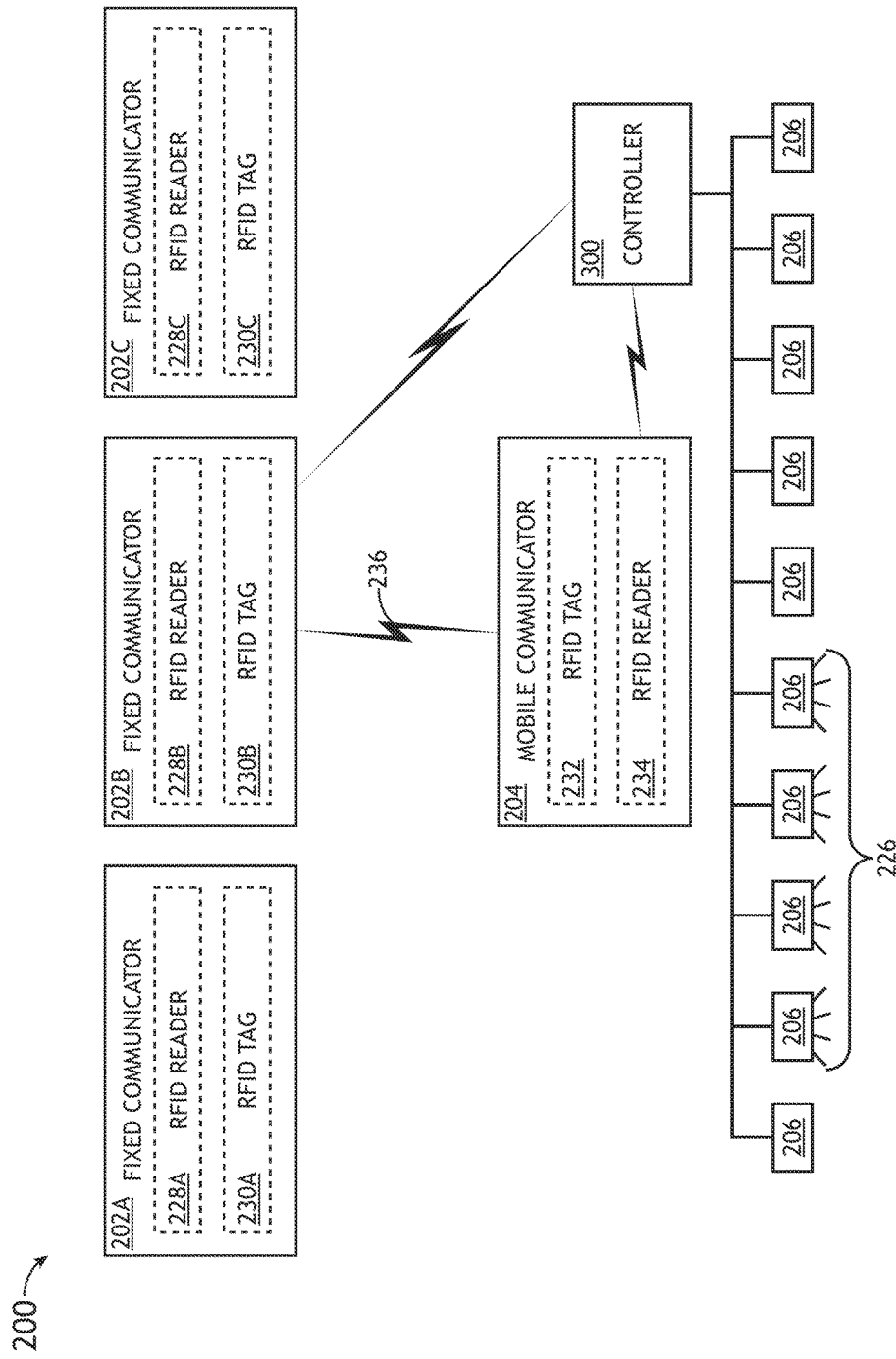
FIG. 8 is a block diagram illustrating an object tracking illumination system in accordance with example embodiments of this disclosure.
Figure 9:
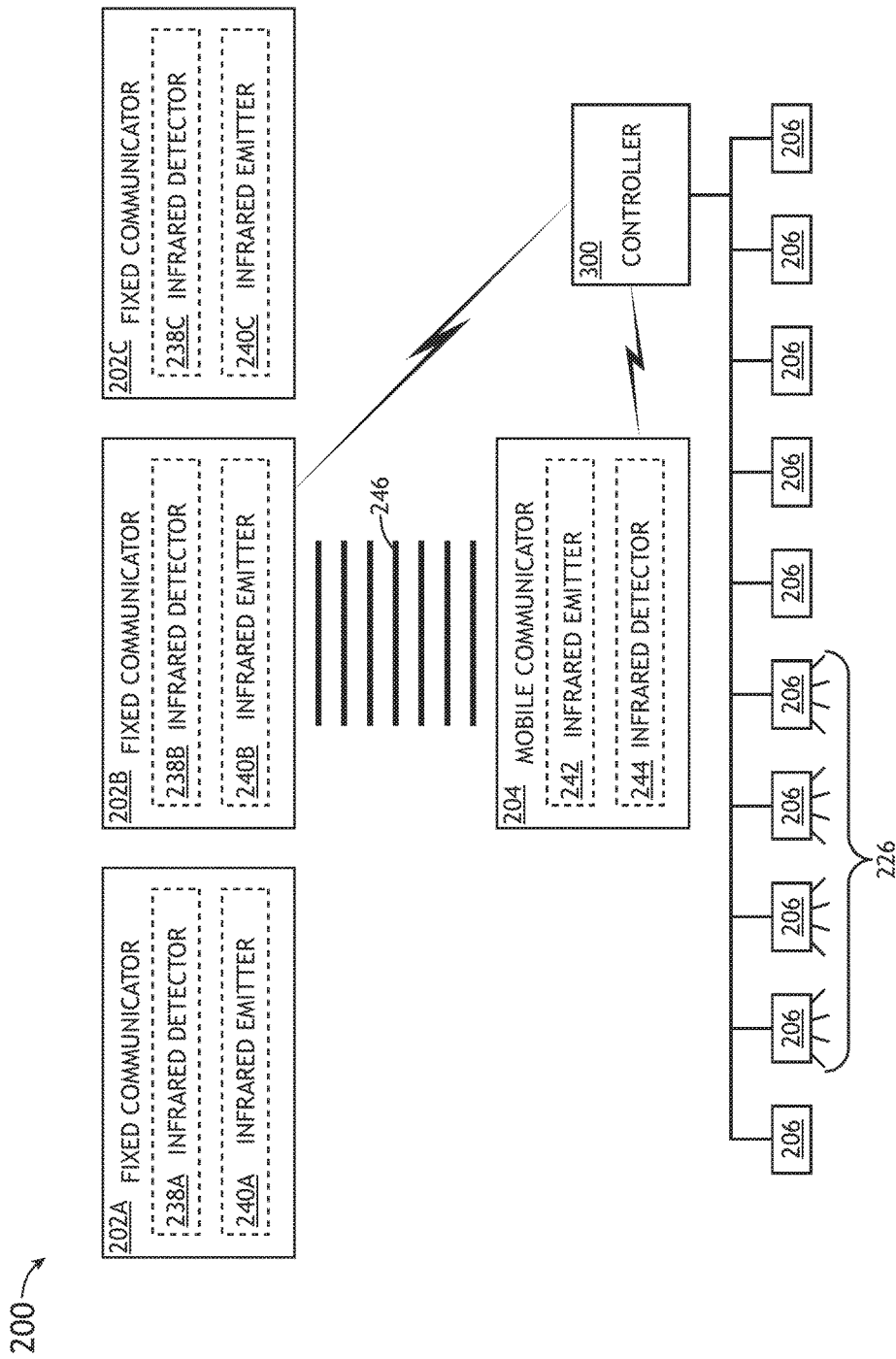
FIG. 9 is a block diagram illustrating an object tracking illumination system in accordance with example embodiments of this disclosure.

FIGS. 7 through 9 show various example embodiments of the illumination system 200 that are further described herein. In embodiments, the illumination system 200 includes a controller 300 in communication with the fixed communicators 202 and/or the mobile communicator 204. For example, the controller 300 can be configured to receive location data corresponding to the location of the mobile communicator 204 (hence, the location of the object 208) from the mobile communicator 204 (e.g., via a wireless communication signal from the mobile communicator 204) or from one or more of the fixed communicators 202 (e.g., via wired or wireless communication signals). The controller 300 is also in communication with (e.g., physically or wirelessly communicatively coupled to) the plurality of light sources 206. In embodiments, the controller 300 is configured to control the light sources 206 based on the location data in order to activate (e.g., turn on or turn up) one or more light sources 206 (e.g., group 226 of light sources 206) to illumination a portion of the passenger cabin 100 in proximity to the object 208 while maintaining other light sources 206 in a deactivated (e.g., turned off or dimmed) state.

Figure 10:
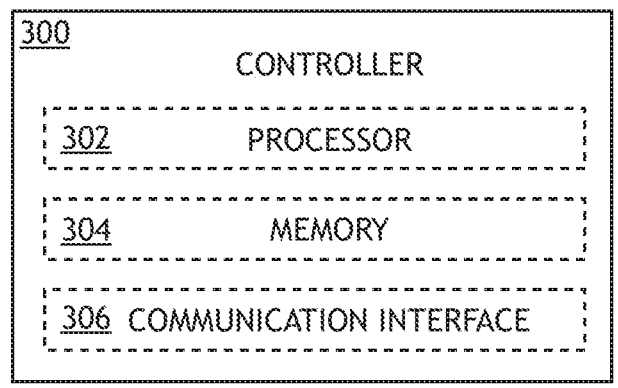
FIG. 10 is a block diagram illustrating a controller for an object tracking illumination system in accordance with example embodiments of this disclosure.

As shown in FIG. 10, the controller 300 includes a processor 302, a memory 304, and a communication interface 306. The processor 302 provides processing functionality for at least the controller 300 and can include any number of processors, micro-controllers, circuitry, field programmable gate array (FPGA) or other processing systems, and resident or external memory for storing data, executable code, and other information accessed or generated by the controller 300. The processor 302 can execute one or more software programs embodied in a non-transitory computer readable medium (e.g., memory 304) that implement techniques described herein. The processor 302 is not limited by the materials from which it is formed or the processing mechanisms employed therein and, as such, can be implemented via semiconductor(s) and/or transistors (e.g., using electronic integrated circuit (IC) components), and so forth.

The memory 304 can be an example of tangible, computer-readable storage medium that provides storage functionality to store various data and or program code associated with operation of the controller 300, such as software programs and/or code segments, or other data to instruct the processor 302, and possibly other components of the illumination system 200/controller 300, to perform the functionality described herein. Thus, the memory 304 can store data, such as a program of instructions for operating the illumination system 200 (including its components), and so forth. It should be noted that while a single memory 304 is described, a wide variety of types and combinations of memory (e.g., tangible, non-transitory memory) can be employed. The memory 304 can be integral with the processor 302, can comprise stand-alone memory, or can be a combination of both. Some examples of the memory 304 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 306 can be operatively configured to communicate with components of the illumination system 200. For example, the communication interface 306 can be configured to retrieve location data from the fixed communicators 202 and/or mobile communicator 204, transmit data for storage in the memory 304, retrieve data from storage in the memory 304, and so forth. In embodiments, the communication interface 306 also includes connections to the light sources 206 or to one or more light source controllers. The communication interface 306 can also be communicatively coupled with the processor 302 to facilitate data transfer between components of the illumination system 200 and the processor 302. It should be noted that while the communication interface 306 is described as a component of controller 300, one or more components of the communication interface 306 can be implemented as external components communicatively coupled to the illumination system 200 via a wired and/or wireless connection. The illumination system 200 can also include and/or connect to one or more input/output (I/O) devices (e.g., via the communication interface 306), such as a display, a mouse, a touchpad, a touchscreen, a keyboard, a microphone (e.g., for voice commands) and so on. For example, the communication interface 306 can include or can be coupled to a transmitter, receiver, transceiver, physical connection interface, or any combination thereof.

FIG. 7 illustrates example embodiments of the illumination system 200 with the fixed communicators 202 and the mobile communicator 204 configured to receive and/or transmit radio frequency (RF) signals 224. For example, the RF signals 224 may include, but are not limited to, ultra-wideband (UWB) signals, IEEE 802 signals (e.g., Wi-Fi signals, Bluetooth signals, ZigBee signals, etc.), or the like. In embodiments, the fixed communicators 202 (e.g., fixed communicators 202A, 202B, and so on) may include receivers 212 (e.g., receivers 212A and 212B) and/or transmitters 214 (e.g., transmitters 214A and 214B) configured to receive RF signals 224 from and/or transmit RF signals 224 to the mobile communicator 204. The mobile communicator 204 can include a receiver 218 and/or transmitter 220 for receiving RF signals 224 from and/or transmitting RF signals 224 to the fixed communicators 202. In some embodiments, the fixed communicators 202 (e.g., fixed communicators 202A, 202B, and so on) include transceivers 216 (e.g., transceiver 216A and transceiver 216B) instead of or in addition to including independent receivers 212 and/or transmitters 214. The mobile communicator 204 may also include a transceiver 222 (e.g., instead of or in addition to receiver 218 and/or transmitter 220). The fixed communicators 202 and the mobile communicator 204 can include any combination of transmitters, receivers, and/or transceivers that facilitate communication of RF signals 224 between the fixed communicators 202 and the mobile communicator 204.

In an embodiment, the mobile communicator 204 is configured to receive RF signals 224 transmitted by the fixed communicators 202. For example, the mobile communicator 204 may detect a first RF signal 224A transmitted by a first fixed communicator 202A, a second RF signal 224B transmitted by a second fixed communicator 202B, and possibly a third RF signal transmitted by a third fixed communicator, and so on. The controller 300 can be configured to determine the location of the object 208 within the passenger cabin 100 based on the RF signals 224 detected by the mobile communicator 204. For example, the controller 300 can be in communication with the mobile communicator 204 and configured to receive location data (e.g., signal information) from the mobile communicator 204.

In another embodiment, the fixed communicators 202 are configured to receive RF signals 224 transmitted by the mobile communicator 204. The controller 300 can be configured to determine the location of the object 208 within the passenger cabin 100 based on the RF signals 224 detected by the fixed communicators 202. For example, the controller 300 can be in communication with the fixed communicators 202 and configured to receive location data (e.g., signal information) from the fixed communicators 202.

The controller 300 can be configured to determine a location of the object 208 within the passenger cabin 100 based on the location data. For example, the controller 300 may be configured to perform a triangulation or MLAT algorithm based on the RF signals 224 communicated between the mobile communicator 204 and the plurality of fixed communicators 202. In some embodiments, the illumination system 200 includes a plurality of controllers in communication with one another to implement the controller 300 functionality. For example, in an embodiment, the controller 300 may include a controller communicatively coupled to the light sources 206 and another controller embedded within or communicatively coupled to the mobile communicator 204 and/or another controller (or controllers) embedded within or communicatively coupled to one or more of the fixed communicators 202.

In some embodiments, the controller 300 is configured to determine the location of the object 208 within the passenger cabin 100 based on a first machine address and a first signal parameter associated with a first signal (e.g., RF signal 224A) communicated between a first fixed communicator 202A and the mobile communicator 204 and at least a second machine address and a second signal parameter associated with a second signal (e.g., RF signal 224B) communicated between a second fixed communicator 202B and the mobile communicator 204. For example, the first machine address may correspond to the first fixed communicator 202A and the second machine address may correspond to the second fixed communicator 202B. The first and second signal parameters can include signal timing parameters (e.g., each signals time of flight, or the like). In embodiments, the controller 300 can be configured to determine fixed locations within the passenger cabin 100 based on the machine addresses of the fixed communicators 202 (e.g., fixed locations of the fixed communicators 202). The controller 300 can be further configured to determine the location of the object 208 based on the fixed locations and signal timing parameters. For example, the controller 300 can be configured to compute the location of the object 208 by executing a triangulation or MLAT algorithm using the fixed locations and the signal timing parameters associated with the RF signals 224 communicated between mobile communicator 204 and the fixed communicators 202.

While first and second signals 224A and 224B are discussed in the example provided herein, it is contemplated that the controller 300 can be configured to determine the location of the object 208 based on any number of (two or more) signals communicated between a respective number of fixed communicators 202 and the mobile communicator 204. Employing a higher number of fixed communicators 202 for triangulation or MLAT may increase accuracy of the determined location of the object 208 within the passenger cabin 100.

After determining the location of the object 208 within the passenger cabin 100 based on the RF signals 224 communicated between the fixed communicators 202 and the mobile communicator 204, the controller 300 may be configured to selectively activate one or more of the light sources 206 (e.g., group 226 of light sources 206) based on the determined location of the object 208 to illuminate a portion of the passenger cabin 100 in proximity to the object 208. For example, the controller 300 can be configured to turn on or turn up a group or subset 226 of the light sources 206 based on the determined location of the object 208 while a remaining portion of the light sources 206 are left off or dimmed.

In some embodiments, the controller 300 is configured to cause the fixed communicators 202 and/or the mobile communicator 204 to periodically transmit or detect RF signals 224. In some embodiments, the controller 300 is configured to control the light sources 206 based on the RF signals 224 communicated between the fixed communicators 202 and the mobile communicator 204 when the controller 300 is in a tracking illumination mode. Further, the controller 300 may be configured to cause the fixed communicators 202 to send signals to or receive signals from the mobile communicator 204 when the controller 300 is in the tracking illumination mode. When the controller 300 is in another operational mode that is different from the tracking illumination mode, the controller 300 may be configured to control the light sources 206 based on programmed lighting schemes or manual (e.g., user-defined) lighting parameters. The controller 300 may be set to the tracking illumination mode based on one or more signals (e.g., received from the mobile communicator 204 or another device), a user input (e.g., via a user interface device), or the like.

FIG. 8 illustrates example embodiments of the illumination system 200 with the fixed communicators 202 and the mobile communicator 204 configured to receive and/or transmit radio frequency identification (RFID) signals 236. In some embodiments, the fixed communicators 202 (e.g., fixed communicators 202A, 202B, 202C, and so on) include RFID readers 228 (e.g., RFID readers 228A, 228B, 228C, etc.), and the mobile communicator 204 includes an RFID tag 232. In other embodiments, the fixed communicators 202 (e.g., fixed communicators 202A, 202B, 202C, and so on) include RFID tags 230 (e.g., RFID tags 230A, 230B, 230C, etc.), and the mobile communicator 204 includes an RFID reader 234.

In some embodiments, the RFID signals 236 can be identification signals sent by active or semi-active RFID tags (e.g., RFID tags 230 or RFID tag 232). In other embodiments, the RFID signals 236 are interrogation signals sent by RFID readers (e.g., RFID readers 228 or RFID reader 234). The mobile communicator 204 may communicate with one of the fixed communicators 202 (e.g., fixed communicator 202B) when the mobile communicator 204 is near enough to (e.g., within a detectable range of) the fixed communicator 202B. For example, the mobile communicator 204 may detect an RFID of the fixed communicator 202B and/or the fixed communicator 202B may detect an RFID of the mobile communicator 204. The controller 300 can be configured to determine a location of the object 208 within the passenger cabin 100 based on one or more RFID signal 236 communicated between the fixed communicator 202B and the mobile communicator 204.

In an embodiment, the controller 300 can be configured to determine the location of the object 208 within the passenger cabin 100 based on the RFID signal (or signals) 236 detected by the mobile communicator 204. For example, the controller 300 can be in communication with the mobile communicator 204 and configured to receive location data (e.g., signal information) from the mobile communicator 204. In some embodiments, the location data includes a machine address (e.g., RFID) of one of the fixed communicators 202 (e.g., fixed communicator 202B) within a detectable range of the mobile communicator 204. The controller 300 can be configured to determine a location of the object 208 based on a location of the fixed communicator 202B associated with the RFID signal 236 (e.g., based on a predetermined location corresponding to the machine address or RFID of the fixed communicator 202B).

In another embodiment, one of the fixed communicators 202 (e.g., fixed communicator 202B) can be configured to detect the RFID of the mobile communicator 204 based on an RFID signal 236 communicated between the fixed communicator 202B and the mobile communicator 204 when the mobile communicator 204 is within detectable range of the fixed communicator 202B. In such embodiments, the controller 300 can be in communication with the fixed communicators 202 and configured to receive location data (e.g., signal information) from the fixed communicators 202. For example, the location data can include a machine address or RFID of one of the fixed communicators 202 (e.g., fixed communicator 202B) that detects the RFID of the mobile communicator 204 based on communication of the RFID signal 236 between the fixed communicator 202B and the mobile communicator 204. The controller 300 can be configured to determine a location of the object 208 based on a location of the fixed communicator 202B associated with the RFID signal 236 (e.g., based on a predetermined location corresponding to the machine address or RFID of the fixed communicator 202B).

At times, the mobile communicator 204 may be within a detectable range of two or more of the fixed communicators 202. In such cases, the controller 300 can be configured to determine the location of the object 208 based on signal quality associated with a plurality of RFID signals 236 communicated between the mobile communicator 204 and two or more of the fixed communicators 202 within the detectable range of the mobile communicator 204. For example, the controller 300 can be configured to determine the location of the object 208 within the passenger cabin 100 based on a location of the fixed communicator 202 having the best quality communication link (e.g., strongest RFID signal 236, highest signal-to-noise ratio (SNR), or the like) with the mobile communicator 204.

After determining the location of the object 208 within the passenger cabin 100 based on one or more RFID signals 236 communicated between the mobile communicator 204 and at least one of the fixed communicators 202, the controller 300 may be configured to selectively activate one or more of the light sources 206 (e.g., group 226 of light sources 206) based on the determined location of the object 208 to illuminate a portion of the passenger cabin 100 in proximity to the object 208. For example, the controller 300 can be configured to turn on or turn up a group or subset 226 of the light sources 206 based on the determined location of the object 208 while a remaining portion of the light sources 206 are left off or dimmed. In some embodiments, the controller 300 is configured to cause the light sources 206 to illumination the portion of the passenger cabin 100 including or proximate to the fixed communicator 202B that detected the RFID of the mobile communicator 204 or that corresponds to an RFID detected by the mobile communicator 204.

In some embodiments, the controller 300 is configured to cause the fixed communicators 202 and/or the mobile communicator 204 to periodically transmit or detect RFID signals 236. In some embodiments, the controller 300 is configured to control the light sources 206 based on one or more RFID signals 236 communicated between the mobile communicator 204 and at least one of the fixed communicators 202 when the controller 300 is in a tracking illumination mode. Further, the controller 300 may be configured to cause the fixed communicators 202 to send signals to or receive signals from the mobile communicator 204 when the controller 300 is in the tracking illumination mode. When the controller 300 is in another operational mode that is different from the tracking illumination mode, the controller 300 may be configured to control the light sources 206 based on programmed lighting schemes or manual (e.g., user-defined) lighting parameters. The controller 300 may be set to the tracking illumination mode based on one or more signals (e.g., received from the mobile communicator 204 or another device), a user input (e.g., via a user interface device), or the like.

FIG. 9 illustrates example embodiments of the illumination system 200 with the fixed communicators 202 and the mobile communicator 204 configured to receive and/or transmit infrared signals 246 (or other optical signals). In some embodiments, the fixed communicators 202 (e.g., fixed communicators 202A, 202B, 202C, and so on) include infrared detectors 238 (e.g., infrared detectors 238A, 238B, 238C, etc.), and the mobile communicator 204 includes an infrared emitter 242. In other embodiments, the fixed communicators 202 (e.g., fixed communicators 202A, 202B, 202C, and so on) include infrared emitters 240 (e.g., infrared emitter 240A, 240B, 240C, etc.), and the mobile communicator 204 includes an infrared detector 244. While example embodiments of the illumination system 200 infrared emitters and detectors are described herein and illustrated in FIG. 9, in other embodiments, the emitters and detectors can be other types of optical emitters or detectors. However, it is advantageous to use emitters and detectors that can emit and detect illumination outside the visible light range, such as infrared illumination.

The mobile communicator 204 may communicate with one of the fixed communicators 202 (e.g., fixed communicator 202B) when the mobile communicator 204 is within a field of view (FOV) of the fixed communicator 202B, or when the fixed communicator 202B is within a FOV of the mobile communicator 204. For example, the mobile communicator 204 may detect an infrared signal 246 transmitted by the fixed communicator 202B and/or the fixed communicator 202B may detect an infrared signal 246 transmitted by the mobile communicator 204. The controller 300 can be configured to determine a location of the object 208 within the passenger cabin 100 based on one or more infrared signals 246 communicated between the fixed communicator 202B and the mobile communicator 204.

In an embodiment, the controller 300 can be configured to determine the location of the object 208 within the passenger cabin 100 based on the infrared signal (or signals) 246 detected by the mobile communicator 204. For example, the controller 300 can be in communication with the mobile communicator 204 and configured to receive location data (e.g., signal information) from the mobile communicator 204. In some embodiments, the location data includes a machine address of one of the fixed communicators 202 (e.g., fixed communicator 202B) within a FOV of the mobile communicator 204. The controller 300 can be configured to determine a location of the object 208 based on a location of the fixed communicator 202B associated with the infrared signal 246 (e.g., based on a predetermined location corresponding to the machine address of the fixed communicator 202B).

In another embodiment, one of the fixed communicators 202 (e.g., fixed communicator 202B) can be configured to detect an infrared signal 246 transmitted to the fixed communicator 202B from the mobile communicator 204 when the mobile communicator 204 is within the FOV of the fixed communicator 202B. In such embodiments, the controller 300 can be in communication with the fixed communicators 202 and configured to receive location data (e.g., signal information) from the fixed communicators 202. For example, the location data can include a machine address of one of the fixed communicators 202 (e.g., fixed communicator 202B) that detects the infrared signal 246 transmitted by the mobile communicator 204. The controller 300 can be configured to determine a location of the object 208 based on a location of the fixed communicator 202B that detects the infrared signal 246 (e.g., based on a predetermined location corresponding to the machine address the fixed communicator 202B).

At times, the mobile communicator 204 may be within a FOV of two or more of the fixed communicators 202 and/or two or more fixed communicators 202 may be within the FOV of the mobile communicator 204. In such cases, the controller 300 can be configured to determine the location of the object 208 based on signal quality associated with a plurality of infrared signals 246 communicated between the mobile communicator 204 and two or more of the fixed communicators 202. For example, the controller 300 can be configured to determine the location of the object 208 within the passenger cabin 100 based on a location of the fixed communicator 202 having the best quality communication link (e.g., strongest infrared signal 246, highest signal-to-noise ratio (SNR), or the like) with the mobile communicator 204.

After determining the location of the object 208 within the passenger cabin 100 based on one or more infrared signals 246 communicated between the mobile communicator 204 and at least one of the fixed communicators 202, the controller 300 may be configured to selectively activate one or more of the light sources 206 (e.g., group 226 of light sources 206) based on the determined location of the object 208 to illuminate a portion of the passenger cabin 100 in proximity to the object 208. For example, the controller 300 can be configured to turn on or turn up a group or subset 226 of the light sources 206 based on the determined location of the object 208 while a remaining portion of the light sources 206 are left off or dimmed. In some embodiments, the controller 300 is configured to cause the light sources 206 to illumination the portion of the passenger cabin 100 including or proximate to the fixed communicator 202B associated with the infrared signal 246 transmitted to or received from the mobile communicator 204.

In some embodiments, the controller 300 is configured to cause the fixed communicators 202 and/or the mobile communicator 204 to periodically transmit or detect infrared signals 246. In some embodiments, the controller 300 is configured to control the light sources 206 based on one or more infrared signals 246 communicated between the mobile communicator 204 and at least one of the fixed communicators 202 when the controller 300 is in a tracking illumination mode. Further, the controller 300 may be configured to cause the fixed communicators 202 to send signals to or receive signals from the mobile communicator 204 when the controller 300 is in the tracking illumination mode. When the controller 300 is in another operational mode that is different from the tracking illumination mode, the controller 300 may be configured to control the light sources 206 based on programmed lighting schemes or manual (e.g., user-defined) lighting parameters. The controller 300 may be set to the tracking illumination mode based on one or more signals (e.g., received from the mobile communicator 204 or another device), a user input (e.g., via a user interface device), or the like.

Figure 11:
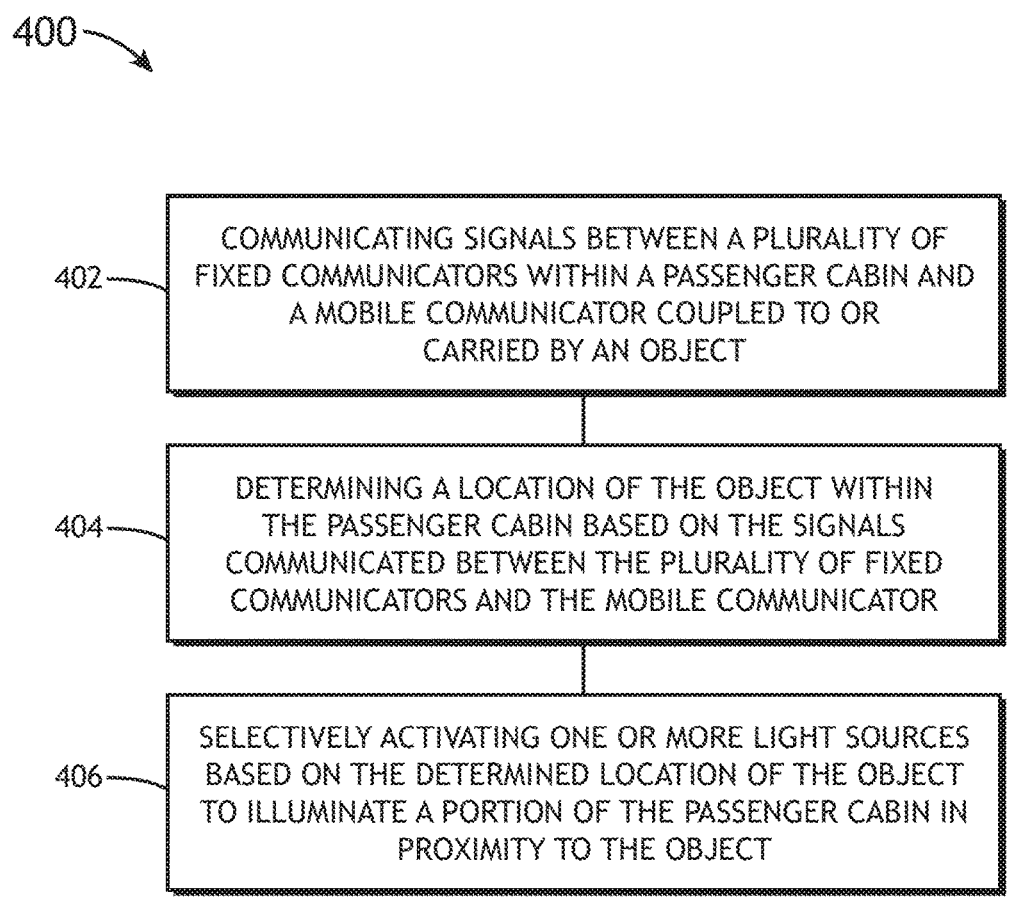
FIG. 11 is a flow diagram illustrating an example implementation of a method for tracking an object within a passenger cabin and illuminating a portion of the passenger cabin in proximity to the object.

FIG. 11 illustrates an example implementation of a method 400 that employs an illumination system, such as the illumination system 200 illustrated in FIGS. 1 through 10, to track an object 208 within a passenger cabin 100 and illuminate a portion of the passenger cabin 100 in proximity to the object 208. In general, operations of disclosed processes (e.g., method 400) may be performed in an arbitrary order, unless otherwise provided in the claims.

The method 400 includes communicating signals between a plurality of fixed communicators 202 within the passenger cabin and a mobile communicator 204 coupled to or otherwise carried by the object 208 (block 402). A location of the object 208 within the passenger cabin 100 is determined based on the signals communicated between the plurality of fixed communicators 202 and the mobile communicator 204 (block 404). For example, the location of the object 208 can be determined based on signals transmitted between the mobile communicator 204 and two or more fixed communicators 202 (e.g., by employing a triangulation or MLAT algorithm, or any other multi-point localization technique). In another example, the location of the object can correspond to a location of a fixed communicator 202 having strongest signal communication with the mobile communicator 204 or a fixed communicator 202 near enough to the mobile communicator 204 to allow for signal communication. After determining the location of the object 208 within the passenger cabin 100, one or more light sources 206 are activated (e.g., turned on or turned up) to illuminate the portion of the passenger cabin 100 in proximity to the object 208 (block 406). For example, light sources 206 in proximity to the object 208 can be turned on or increased in brightness/intensity in order to improve visibility for cabin attendants or passengers receiving service from the cabin attendants. Meanwhile, other light sources 206 in the passenger cabin can be maintained in a deactivated (e.g., turned off or dimmed) state so as not to disturb passengers that may be resting (e.g., sleeping or viewing entertainment) in other portions of the cabin.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An illumination system for a passenger cabin, comprising:
   a plurality of light sources disposed within the passenger cabin, respective ones of the plurality of light sources configured to illuminate respective portions of the passenger cabin;
   a plurality of fixed communicators disposed within the passenger cabin, the plurality of fixed communicators configured to send signals to or receive signals from a mobile communicator coupled to or carried by an object; and
   a controller in communication with the plurality of light sources and at least one of the plurality of fixed communicators or the mobile communicator, the controller configured to:
      determine a location of the object within the passenger cabin based on signals communicated between the plurality of fixed communicators and the mobile communicator; and
      selectively activate one or more of the light sources based on the determined location of the object to illuminate a portion of the passenger cabin in proximity to the object.

2. The illumination system of claim 1, wherein the plurality of fixed communicators comprise a plurality of RF transmitters, RF receivers, or RF transceivers.

3. The illumination system of claim 1, wherein the plurality of fixed communicators comprise a plurality of infrared light emitters or detectors.

4. The illumination system of claim 1, wherein the plurality of fixed communicators comprise a plurality of RFID tags or RFID readers.

5. The illumination system of claim 1, wherein the plurality of fixed communicators are configured to periodically send signals to or receive signals from the mobile communicator.

6. The illumination system of claim 1, wherein the controller is configured to cause the plurality of fixed communicators to send signals to or receive signals from the mobile communicator when the controller is in a tracking illumination mode.

7. The illumination system of claim 1, wherein the controller is configured to determine the location of the object within the passenger cabin based on a machine address associated with a signal communicated between a fixed communicator of the plurality of fixed communicators and the mobile communicator, the machine address corresponding to the fixed communicator.

8. The illumination system of claim 1, wherein the controller is configured to determine the location of the object within the passenger cabin based on (i) a first machine address and a first signal parameter associated with a first signal communicated between a first fixed communicator of the plurality of fixed communicators and the mobile communicator and (ii) a second machine address and a second signal parameter associated with a second signal communicated between a second fixed communicator of the plurality of fixed communicators and the mobile communicator, the first machine address corresponding to the first fixed communicator and the second machine address corresponding to the second fixed communicator.

9. The illumination system of claim 8, wherein the first and second signal parameters comprise signal timing parameters.

10. The illumination system of claim 1, wherein the controller is configured to selectively activate the one or more light sources to illuminate the portion of the passenger cabin in proximity to the object by switching the one or more light sources from an off state to an on state.

11. The illumination system of claim 1, wherein the controller is configured to selectively activate the one or more light sources to illuminate the portion of the passenger cabin in proximity to the object by increasing a brightness of the one or more light sources relative to others light sources of the plurality of light sources.

12. A system, comprising:
a cart, the cart including:
a frame;
a plurality of rollers coupled to the frame; and
a mobile communicator carried by the frame; and
an illumination system for a passenger cabin, the illumination system including:
a plurality of light sources disposed within the passenger cabin, respective ones of the plurality of light sources configured to illuminate respective portions of the passenger cabin;
a plurality of fixed communicators disposed within the passenger cabin, the plurality of fixed communicators configured to send signals to or receive signals from the mobile communicator; and
a controller in communication with the plurality of light sources and at least one of the plurality of fixed communicators or the mobile communicator, the controller configured to:
determine a location of the cart based on signals communicated between the plurality of fixed communicators and the mobile communicator; and
selectively activate one or more of the light sources based on the determined location of the cart to illuminate a portion of the passenger cabin in proximity to the cart.

13. The system of claim 12, wherein the plurality of fixed communicators are configured to periodically send signals to or receive signals from the mobile communicator.

14. The system of claim 12, wherein the controller is configured to cause the plurality of fixed communicators to send signals to or receive signals from the mobile communicator when the controller is in a tracking illumination mode.

15. The system of claim 12, wherein the controller is configured to determine the location of the cart within the passenger cabin based on a machine address associated with a signal communicated between a fixed communicator of the plurality of fixed communicators and the mobile communicator, the machine address corresponding to the fixed communicator.

16. The system of claim 12, wherein the controller is configured to determine the location of the cart within the passenger cabin based on (i) a first machine address and a first signal parameter associated with a first signal communicated between a first fixed communicator of the plurality of fixed communicators and the mobile communicator and a second machine address and (ii) a second signal parameter associated with a second signal communicated between a second fixed communicator of the plurality of fixed communicators and the mobile communicator, the first machine address corresponding to the first fixed communicator and the second machine address corresponding to the second fixed communicator.

17. The system of claim 16, wherein the first and second signal parameters comprise signal timing parameters.

18. The system of claim 12, wherein the controller is configured to selectively activate the one or more light sources to illuminate the portion of the passenger cabin in proximity to the cart by switching the one or more light sources from an off state to an on state.

19. The system of claim 12, wherein the controller is configured to selectively activate the one or more light sources to illuminate the portion of the passenger cabin in proximity to the cart by increasing a brightness of the one or more light sources relative to others light sources of the plurality of light sources.

20. A method for tracking an object within a passenger cabin and illuminating a portion of the passenger cabin in proximity to the object, comprising:
communicating signals between a plurality of fixed communicators within the passenger cabin and a mobile communicator coupled to or carried by the object;
determining a location of the object within the passenger cabin based on the signals communicated between the plurality of fixed communicators and the mobile communicator; and
selectively activating one or more light sources based on the determined location of the object to illuminate the portion of the passenger cabin in proximity to the object.

* * * * *